July 3, 1962  J. W. HUTCHINSON ETAL  3,042,449
RECLINE SEAT CONTROL MECHANISM
Filed Dec. 30, 1959  2 Sheets-Sheet 1

INVENTORS
John W. Hutchinson
Raymond R. Fenn
Lester L. Preiss
Albert H. Kirchner
BY  ATTORNEY

United States Patent Office 3,042,449
Patented July 3, 1962

3,042,449
RECLINE SEAT CONTROL MECHANISM
John W. Hutchinson, Coral Gables, Raymond R. Fenn, Miami Springs, and Lester L. Preiss, Miami, Fla., assignors to Flight Equipment and Engineering Corp., Miami, Fla., a corporation of Florida
Filed Dec. 30, 1959, Ser. No. 862,956
5 Claims. (Cl. 297—366)

The present invention relates to recline control mechanism for seats, including especially the seats or chairs installed for passenger occupancy in vehicles such as aircraft, and its principal objects are to provide simple, durable, reliable and foolproof mechanism by which the seat occupant can readily and at all times adjust the inclination of the seat back through an infinite, or at least indefinitely large, number of angular positions and fix the back at any selected angle.

Related objects are to provide a novel type of actuating means for application to a known form of seat back mounting and "motor" mechanism therefor for controlling the starting and stopping of the mechanism responsive to pressure of the occupant to move the back in reclining direction and to release of such pressure to permit the back to be restored toward upright position.

Other objects and advantages will be apparent as the description hereinafter of the accompanying drawings proceeds.

In the accompanying drawings forming part of this application for Letters Patent, and which illustrate a presently preferred embodiment of the invention, FIGURE 1 is a perspective view of a representative type of reclining seat, with one of the side arms partly broken away to show a form of the new recline control mechanism incorporated therein;

Figure 1:
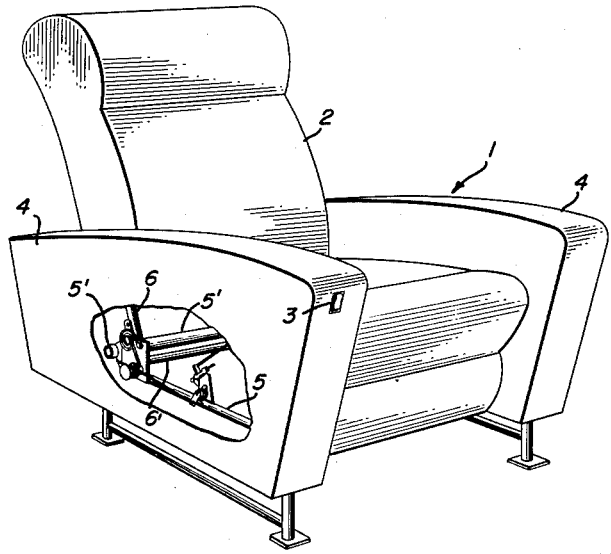

In these figures, the reference numeral 1 designates in its entirety a seat or chair, of the type commonly installed in vehicles, and particularly in the passenger cabins of airplanes, having a reclining back 2 which is hinged or pivoted to a base and controlled by an actuating button 3 mounted in one of the side arms or arm rests 4. This button is readily accessible to the occupant of the seat, and the arrangement, which is substantially standard in seats of this general character, is such that the angle of recline of the seat back is normally fixed but can be adjusted by the occupant depressing the button with the result that the back can then be pushed back to any desired angle of recline up to a predetermined limit of adjustment or, if no pressure be applied to the back, the back can be allowed to swing forward about a hinge or pivot in its lower portion under the influence of a spring device until a position of maximum upright position, or minimum recline, is attained. In either case, movement of the back forward or backward, under the influence of the spring device or under the influence of pressure applied by the occupant overcoming the spring device, can be stopped wherever desired by simply releasing the button 3 and the back will remain fixed at the stopped position, holding the attained degree of recline.

The present invention adopts the foregoing features of the prior art and provides an improved and simplified control mechanism by which depression of the actuating button permits the recline mechanism to be moved and release of the button stops the recline mechanism with certainty and securely exactly at any one of an infinite, or at least indefinitely large, number of positions of adjustment within the range of angularity established by the design of the mechanism.

Figure 4:
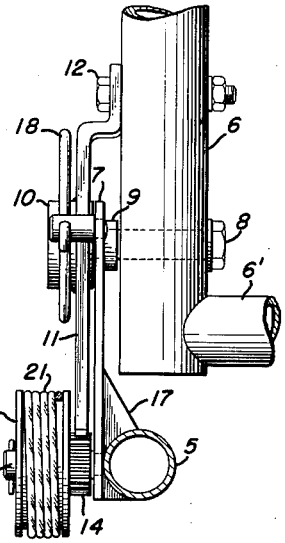
FIG. 4 is a front elevational view taken on the section line 4—4 of FIG. 3.
Figure 2:
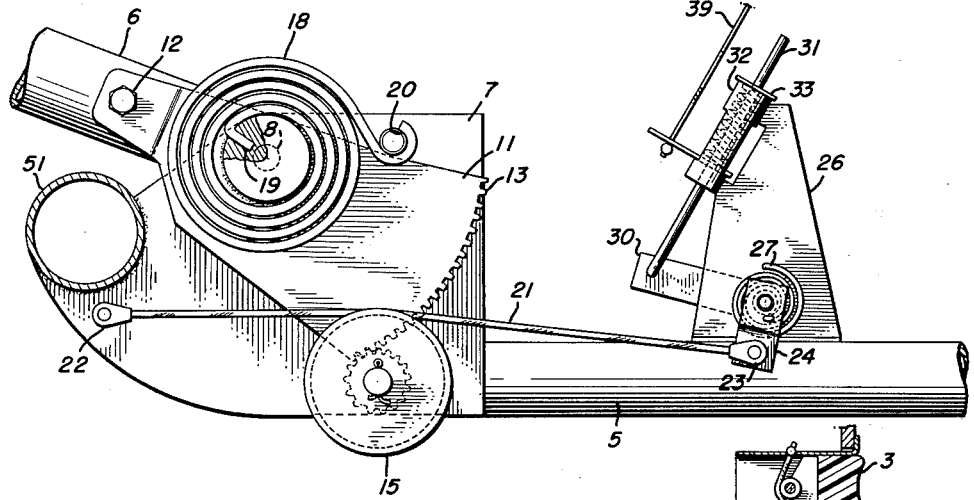
FIG. 2 is a fragmentary detail view on an enlarged scale showing the mechanism in side elevation with the parts in the position they occupy when the seat back is in fully reclined position and the actuating element is not being operated.
Figure 3:
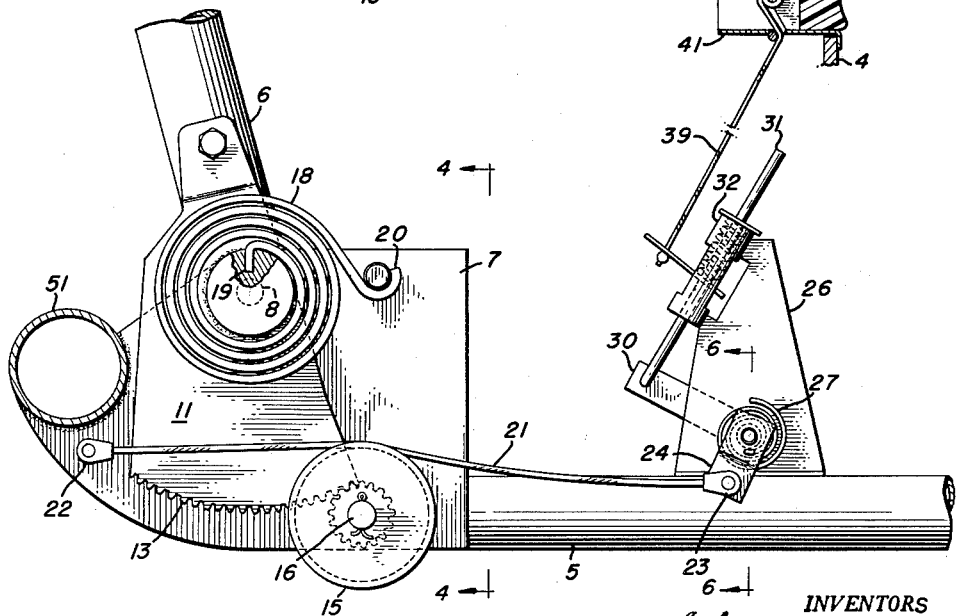
FIG. 3 is a similar view showing the parts in the position they occupy when the back is in upright position and the actuating element is being held in actuating, i.e., releasing, position.

The new control mechanism is constructed as follows:

The fixed base structure of the chair includes framing members extending longitudinally and transversely and connected together at the rear of the chair, and the back 2 includes a frame having members extending lengthwise of the back connected at their lower ends to similar members running crosswise of the back. Generally these members are made of metallic tube stock for rigidity and lightness, and they are so shown in the exemplary embodiment of the invention selected as an illustration in the drawings. There the lengthwise and transverse framing members of the fixed base are designated 5 and 5' respectively, and the lengthwise and transverse framing members of the back are designated 6 and 6' respectively. FIG. 4 shows the junction of the back framing members at one of the two lower corners of the back, and FIGS. 1, 2 and 3 show the two base framing members connected at the corresponding rear corner of the base.

The back frame is pivoted or hinged to the base frame for swinging movement of the back about a pivot axis fixed in the base. A convenient arrangement providing for the establishment of the pivot axis comprises interposing a stout metal plate 7 between the base framing members 5 and 5' at each of the two rear corners of the base. Each plate is welded or otherwise secured to the two members and fixedly connects them together and mounts a stout pivot pin 8 in the upper portion of the plate. The two pivot pins, only one of which is shown in the drawings, are aligned on a common axis on opposite sides of the chair, and each is mounted in the lower portion of one of the back frame lengthwise members 6. The details of the mounting and of the pin construction are not important, as long as each of the pins projects from the member 6, preferably outwardly from it, to provide a pivot portion 9, preferably enlarged radially as shown in FIG. 4, journaled in the plate 7 so that the back is mounted for swinging movement relatively to the seat bottom frame for recline positions.

At one side of the seat, for example the righthand side as shown in FIG. 1, the pivot pin 8 is further extended out beyond the journal portion 9 to provide an enlarged hub 10. This hub penetrates a gear, best made in the form of a sector plate 11, which may be welded to the hub around the opening in the gear through which the hub projects. The gear is fixed to the seat back frame as by bolting its top end portion to the back frame longitudinal member 6, as shown at 12 in FIG. 4. It is convenient to offset the bolted connection of the gear to the frame member so that the downwardly extending body of the gear will clear the plate 7. Thus the teeth 13 formed on the lower end edge of the gear 11 are meshed with the teeth of a small pinion 14 which is welded co-axially to a spool 15 which is journaled on a short post 16 extending out horizontally from the lower part of the plate 7. A gusset 17 may be welded between the plate 7 and the seat base frame member 5 in the region of the post 16 to stiffen the connection.

It will be evident that the gear 11 will swing with recline movement of the back 2 and will rotate the spool 15. A back return "motor" spring 18 of volute form has one end anchored to the hub 10 of the pivot pin 8, as shown at 19, and its other end anchored to a stout pin 20 projecting from the plate 7. The spring is pre-tensioned so as to bias the back 2 to the full upright position shown in FIG. 3. Movement of the back to the full recline position shown in FIG. 2 winds the spring 18 to increased tension and, as has been explained, involves rotation of the spool.

The present invention provides improved means for preventing and controlling movement of the back throughout its range between full recline and full upright positions, and this mechanism will now be described.

A locking cable 21 is wrapped some four or more times around the smooth periphery of the spool 15 so as to snub the spool, or prevent its rotation, when the cable is pulled taut, while permitting rotation when loosened. The rear end 22 of the cable is anchored to the rear portion of the plate 7. The forward end 23 is attached to the free end of a lever 24, the opposite end of which is welded to a stub shaft 25 which is journaled in a bracket 26 upstanding from a part of the seat base frame member 5 considerably forward of the plate 7. The axes of the aligned pivot pins 8, the shaft 25 and the post 16 are all parallel. A light volute spring 27 has its ends connected respectively to the lever 24 and the bracket 26, as shown at 28 and 29 respectively, with the spring wound slightly in tension so that the lever is biased counterclockwise as viewed in FIGS. 2 and 3, thus normally tensioning the cable 21 and pulling its turns tight about the spool 15 so as to prevent rotation of the spool. As will be understood, this fixation of the spool holds the pinion 14 against rotation and thus locks the gear 11, so that the back 2 of the chair is held in fixed angular relation to the seat bottom.

Figure 5:
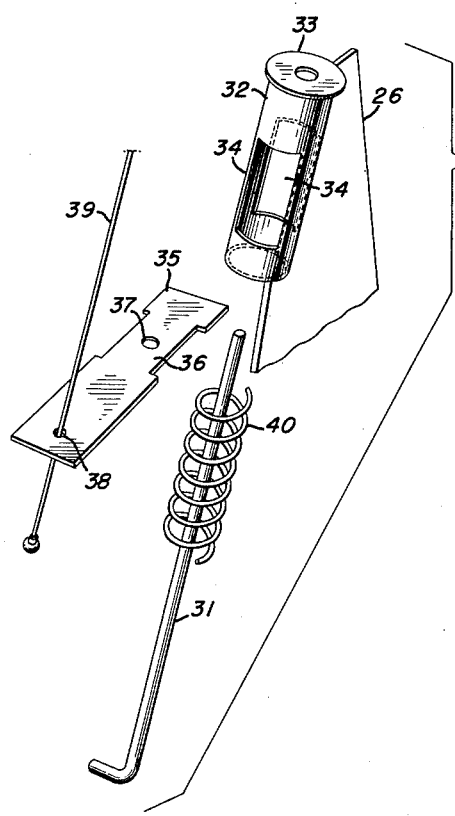
FIG. 5 is an exploded perspective view of the release rod and its appurtenant mechanism.
Figure 6:
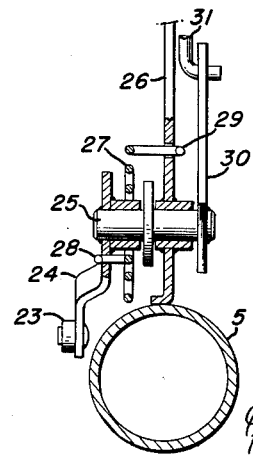
FIG. 6 is a cross-sectional view taken on the line 6—6 of FIG. 4.

To alter the angular setting of the seat back it will be appreciated that the cable 21 must be slackened so as to permit the spool 15 to rotate, thereby freeing the pinion 14 for rotation and the gear 11 for swinging movement about the axis of the pivot pin 8. This slackening of the cable is accomplished by the following mechanism:

Welded to the end of the stub shaft 25 opposite the end to which the lever 24 is welded is an arm 30. The lever 24 is of course itself an arm of the stub shaft 25, just as the arm 30 is, and these two arms cooperate with the stub shaft to form a bellcrank lever device 24—25—30. Hooked into the free end of the bellcrank lever device arm 30 is the lower end of a rod 31 which extends up through a generally cylindrical housing 32 which is welded onto an upper rear edge of the bracket 26, as best shown in FIGS. 2 and 3. The rod is guided for axial sliding movement in the housing 32 by snugly fitting an axial hole in a top cover 33 provided for the housing. The bottom of the housing may be left open. Relatively wide lengthwise slots 34 (see FIG. 5) are formed in diametrically opposite sides of the housing wall, and a small flat and generally oblong plate 35 is notched at its sides to provide a narrow waist 36 fitting the slots, with shoulders at the ends of the waist overlapping the housing wall. The arrangement is such that the plate 35 can be moved up and down in the housing 32 but is held against endwise movement that would separate the plate from the housing. The plate is provided with a hole 37 at the middle of its waist and with another hole 38 in its protruding end. The rod 31 fits snugly through the hole 37 and a release cable 39 extends through the hole 38 and has its end knotted or enlarged so that when it is pulled the plate 35 will be raised against the tension of a light coil spring 40 enclosed within the housing, above the plate, which tends to keep the plate lowered in the housing, seated in the lower ends of the slots 34, and lying in a plane that is quite accurately normal to the axis of the rod 31. In this position of the plate the rod is of course free to slide downwardly through the hole 37, and it does so slide until stopped by tightening of the locking cable 21 about the spool 15 responsive to rotation of the stub shaft 25 under the influence of the light volute spring 27.

However, if the released cable 39 be pulled upwardly, the plate 35 becomes lifted. The fit of the plate's waist 36 in the slots 34 of the housing is loose enough to allow the plate to tilt slightly, in response to the unbalanced pull on its outer extremity, to a plane making an oblique angle with the axis of the rod 31. Thus cocked on the rod, as shown in FIG. 3, the plate seizes the rod and lifts it, against the tension of the light coil spring 40. Thus the locking cable 21 is slackened, as will be understood, and the seat back is free to swing about the axis of the pivot pins 8. The actuating button 3, it will be recalled, is mounted in the arm rest 4 on the side of the chair containing the recline control mechanism. In the illustrated embodiment of the invention this button is contained within a tubular casing 41 through which the release cable 39 extends diametrically and in which it is fixed so that when the button is depressed (compare the positions of the parts shown in FIGS. 2 and 3) the cable will be pulled sufficiently to lift the plate 35 and the rod 31 far enough to move the parts to their releasing positions.

With the parts in their releasing position and the back thus freed for swinging movement, the back may be adjusted toward recline position by the action of the seat occupant simply pushing against it, so that the back will swing back against the tension of the motor spring 18, or the back can be adjusted toward upright position by exerting no pressure against it so that the spring 18 will swing the back forward. Release of the pressure on the actuating button instantly tensions the locking cable 21 so as immediately to lock the parts accurately in their position of instantaneous adjustment. It will be appreciated that these positions are of infinite, or at least indefinitely large, number within the range permitted by the mechanical design. It is desirable to fix appropriate limits to the range of movement, as by so proportioning the parts that the gear 11, for example, will be stopped by abutting the seat frame member 5' at one end of its movement (see FIG. 3) and by engaging the anchor pin 20 for the spring 18 at the other limit of its range of movement.

It is believed that the accompanying drawings and the foregoing description of the preferred embodiment of the invention illustrated by the drawings will be found adequate to an understanding of the principles of the invention by those skilled in the art. It is to be understood that numerous changes, additions and substitutions of equivalents may be made within the spirit of the invention and within the scope and purview of the appended claims.

We claim:

1. Control mechanism for a recline seat of the type in which a seat frame is provided with an element that is rotatable responsive to movement of the seat back and is normally maintained against rotation by the snubbing action of a cable wound around the element, said mechanism comprising a member biased to apply tension to the cable, a rod connected to the member, a plate having an opening through which the rod extends, and actuating means for moving the plate from a position in which the plate is substantially normal to the rod and the rod is loose in the opening to a position in which the plate is canted with respect to the rod and frictionally engages the rod to move with the plate and move the member and relieve the tension on the cable, thereby freeing the rotatable element for rotation.

2. Control mechanism for a recline seat of the type in which a seat frame is provided with a spool that is rotatable responsive to movement of the seat back and is normally maintained against rotation by the snubbing action of a cable wound around the spool, said mechanism comprising a member biased to apply tension to the cable, a rod connected to the member, a plate having an opening through which the rod extends, and actuating means for moving the plate from a position in which the plate is substantially normal to the rod and the rod is loose in the opening to a position in which the plate is canted with respect to the rod and frictionally engages the rod to move with the plate and move the member and relieve the tension on the cable, thereby freeing the spool for rotation.

3. Control mechanism for a recline seat of the type in which a seat frame is provided with an element that is rotatable responsive to movement of the seat back and is normally maintained against rotation by the snubbing action of a cable wound around the element, said mechanism comprising a lever spring-biased to apply tension to the cable, a rod connected to the lever, a plate having an opening through which the rod extends, and actuating means for moving the plate from a position in which the plate is substantially normal to the rod and the rod is loose in the opening to a position in which the plate is canted with respect to the rod and frictionally engages the rod to move with the plate and shift the lever and relieve the tension on the cable, thereby freeing the rotatable element for rotation.

4. Control mechanism for a recline seat of the type in which a seat frame is provided with an element that is rotatable responsive to movement of the seat back and is normally maintained against rotation by the snubbing action of a cable wound around the element, said mechanism comprising a bellcrank lever device having one arm connected to the cable and biased to apply tension to the cable, a rod connection to the other arm of the bellcrank lever device, a plate having an opening through which the rod extends, and actuating means for moving the plate from a normal position in which the rod is loose in the opening to a position in which the plate frictionally engages the rod to move with the plate and swing the bellcrank lever device, thereby relieving the tension on the cable and freeing the rotatable element for rotation.

5. Control mechanism for a recline seat of the type in which a seat frame is provided with an element that is rotatable responsive to movement of the seat back and is normally maintained against rotation by the snubbing action of a cable wound around the element, said mechanism comprising a bracket on the seat frame, a pivot pin journaled on the bracket, a spring biasing the pin for rotation in one direction, a first arm fixed to the pin and connected to the cable to apply tension to the cable responsive to rotation in said biased direction, a second arm fixed to the pin, an elongated casing fixed in generally upright position on the bracket above the second arm and having an abutment in its lower portion, a rod extending lengthwise through the casing and having its lower end connected to the second arm, a plate having a portion within the casing having a hole through which the rod extends and having a portion projecting laterally from the casing, a spring contained within the casing above the plate and normally biasing the plate downward against said abutment in the lower part of the casing so that the plate will lie in a plane normal to the axis of the rod with the rod free to slide through the hole in the plate under the influence of the pin-biasing spring so that the pin is free to rotate and tension will be applied to the cable, and actuating means connected to the portion of the plate which projects from the casing for lifting the plate against the action of the spring within the casing into a plane oblique to the axis of the rod so that the rising plate will frictionally grip the rod and pull the rod upwardly, thereby rotating the pin against the influence of the pin-biasing spring to relieve tension on the cable and release the rotatable element for rotation and the seat back for adjustment.

References Cited in the file of this patent
UNITED STATES PATENTS

| | | |
|---|---|---|
| 2,730,165 | Jones | Jan. 10, 1956 |
| 2,744,566 | Schmidt | May 8, 1956 |
| 2,802,516 | Liljengren | Aug. 13, 1957 |
| 2,891,602 | Molins | June 23, 1959 |